United States Patent [19]

Roberts et al.

[11] Patent Number: 4,628,956
[45] Date of Patent: Dec. 16, 1986

[54] FLOAT VALVE MECHANISM

[75] Inventors: Charles G. Roberts, Richmond; Philip E. Hynds, South Yardley, both of England

[73] Assignee: Vecone Development Corporation, London, England

[21] Appl. No.: 797,444

[22] Filed: Nov. 13, 1985

[30] Foreign Application Priority Data

Nov. 14, 1984 [GB] United Kingdom ................ 8428736

[51] Int. Cl.$^4$ ........................ F16K 31/22; F16K 33/00
[52] U.S. Cl. ..................................... 137/404; 137/426; 137/435; 137/436; 137/448; 137/433; 251/120
[58] Field of Search ............... 137/403, 404, 407, 408, 137/426, 428, 429, 430, 433, 434, 435, 436, 448, 451; 251/120

[56] References Cited

U.S. PATENT DOCUMENTS

| 513,474 | 1/1894 | Bate | 137/404 |
|---|---|---|---|
| 699,249 | 5/1902 | Sharples | 137/404 |
| 717,450 | 12/1902 | Prowant | 137/448 |
| 1,972,331 | 9/1934 | Dean | 137/426 |
| 1,980,430 | 11/1934 | Pearse | 137/426 |
| 2,499,409 | 3/1950 | Norway | 137/448 |
| 2,507,545 | 5/1950 | Samiran | 137/429 |
| 3,310,065 | 3/1967 | Godshalk | 137/426 |
| 3,331,387 | 7/1967 | Walters | 137/426 |

FOREIGN PATENT DOCUMENTS

| 59112 | 3/1913 | Fed. Rep. of Germany | 137/404 |
|---|---|---|---|
| 438846 | 8/1948 | Italy | 137/448 |
| 335346 | 5/1972 | U.S.S.R. | |

Primary Examiner—George L. Walton
Attorney, Agent, or Firm—Barnes & Thornburg

[57] ABSTRACT

A float valve mechanism comprising a housing 13 defining a closed chamber 14 having an inlet 12 and an outlet 22. The chamber 14 is closed by a cap 17 threaded on to it. The valve head 32 has a conical surface 34 engaging a conical valve seat 33 and a skirt portion 30 a slightly smaller diameter than the outlet port 22 so that water flowing through the outlet is throttled as the valve nears its closed position. The valve head 32 can be formed separately, of rubber like material, and snap fitted on the valve stem 29.

10 Claims, 3 Drawing Figures

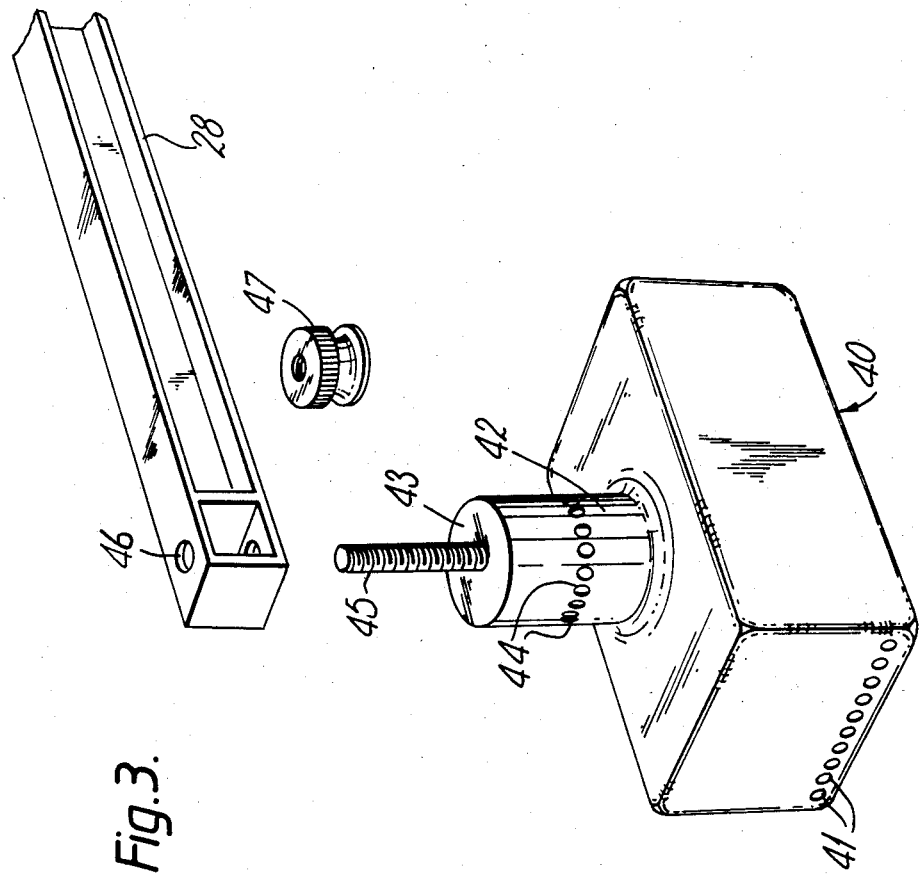

FLOAT VALVE MECHANISM

DESCRIPTION

The present invention relates to a float valve mechanism.

Various float valve mechanisms have been described in the past for use domestically in, for example, water tanks, WC cisterns or the like and also for use industrially in a number of situations in which a liquid fills a tank.

In European Patent Publication No. 0110577, which corresponds to U.S. Ser. No. 555,690, there is described a float valve mechanism which comprises a housing defining a closed chamber having an inlet port connected to an inlet pipe to the cistern or tank, and an outlet port from the chamber having a valve seat surrounding the port. The valve member passes through the opening and has a valve head located within the chamber, the valve head being directly connected to a lever which is pivoted about an axis and carries the float. The valve head is pivotally movable in an integral manner with the lever along a path passing through the outlet port of the chamber. Water pressure within the chamber normally urges the valve to the closed position and the weight of the float, when the water has fallen below a given level in the tank, overcomes this pressure to allow water to flow from the chamber into the cistern.

While such a construction is generally satisfactory, when the water pressure is fairly high at the inlet port, there can be a danger of water hammer occurring because the valve shuts rather suddenly.

It is now proposed, according to the present invention, to provide a float valve mechanism for a cistern or tank, said mechanism comprising a valve housing defining a closed chamber having an inlet port adapted to be connected to an inlet pipe to the cistern or tank, an outlet port from the chamber having a conical valve seat surrounding the port, a valve member passing through the outlet port and having a valve head located within the chamber and a pivotally mounted lever having a float at one end and means connecting the lever to the valve member to raise the head from the seat, when water or other liquid in the cistern or tank falls below a certain level, to allow liquid to flow from the chamber via the outlet port, the valve member being connected directly to the lever, so as to pivot integrally therewith along a path passing through said outlet port, the valve head being formed with a conical surface adapted to engage the conical valve seat and a skirt portion extending beyond the narrower end of the conical surface and having a diameter slightly less than the smallest diameter of the conical valve seat, so that, in the closed position of the valve, it passes through the outlet port.

With such a construction, because the skirt portion has a diameter only slightly less than the smallest diameter of the conical valve seat, the closing of the valve is slowed down so that the outflow of water is not stopped very suddenly, as has been experienced sometimes previously. When the valve is in the fully opened position the skirt portion does not interfere with the flow of fluid because it is positioned significantly above the conical valve seat.

The skirt portion may itself be conically tapered with a taper angle of less than that of the conical surface of the valve head or it could have a substantially cylindrical outer surface.

In order further to assist in the reduction of the possibility of water hammer, the valve head is advantageously formed of a resilient material. It can, for example, be formed of a soft plastic or rubber and is therefore preferably formed separately from the valve stem which connects the head with the lever. This can be achieved in a number of ways but for simplicity of manufacture, the valve head is preferably a snap fit on the valve stem.

In order further to facilitate the mounting of the valve head on the valve stem, the closed chamber is preferably formed with a main body portion in which the inlet and outlet port are formed, the body portion having a threaded opening on a side of the chamber spaced from the inlet and outlet ports, to enable the head to be fitted on to the valve stem by passing the head through the opening and engaging it on the valve stem after the valve stem has been passed through the outlet port, a threaded cap being securable on the threaded opening to close the chamber. In this way, the valve head can be inserted through the opening when the cap has been removed from the chamber and can, if a snap fit is provided, simply be pushed onto the end of the valve stem whereafter the cap can be screwed on.

In order to be able to withstand significant pressures, the cap is advantageously domed so as to be outwardly convex. It is also advantageous for it to be provided with a plurality of angularly spaced radially extending ribs, which both strengthen the cap against internal pressure and facilitates screwing of the cap on to and off the main body portion.

When the valve head is formed separately from the valve stem, it is important that it should not disengage from the valve stem when the valve closes. Preferably, therefore, a stop is provided on the housing to be engaged by the lever as it pivots towards the closed position of the valve after the valve head has engaged the valve seat. The resilience of the valve head will allow this slight further movement before the stop is engaged by the lever.

Advantageously an abutment is provided on the housing so that when the valve is in the fully open position the lever engages this abutment before the valve head itself engages the interior of the chamber.

With the valve of mechanism of this nature, it is advantageous for the float to be a weighted float. In a preferred construction according to the present invention, the float comprises a closed chamber having a first aperture or apertures adjacent to the bottom of the container and a second aperture or apertures spaced from the top of the container, whereby as the water level in the tank or cistern rises, water will flow in through the lower aperture or apertures, until the water level reaches that of the upper aperture or apertures, whereupon no further water can be introduced, thereby to provide a weighted float.

With such a construction the actual weight of water within the container is predetermined by the positioning of the holes and the user or fitter of the mechanism does not himself have to judge the correct amount by which the container should be filled.

In order that the invention may more readily be understood, the following description is given, merely by way of example, reference being made to the accompanying drawings, in which:-

FIG. 3 is a schematic perspective view showing the float and the means by which it is to be mounted.

Figure 1:
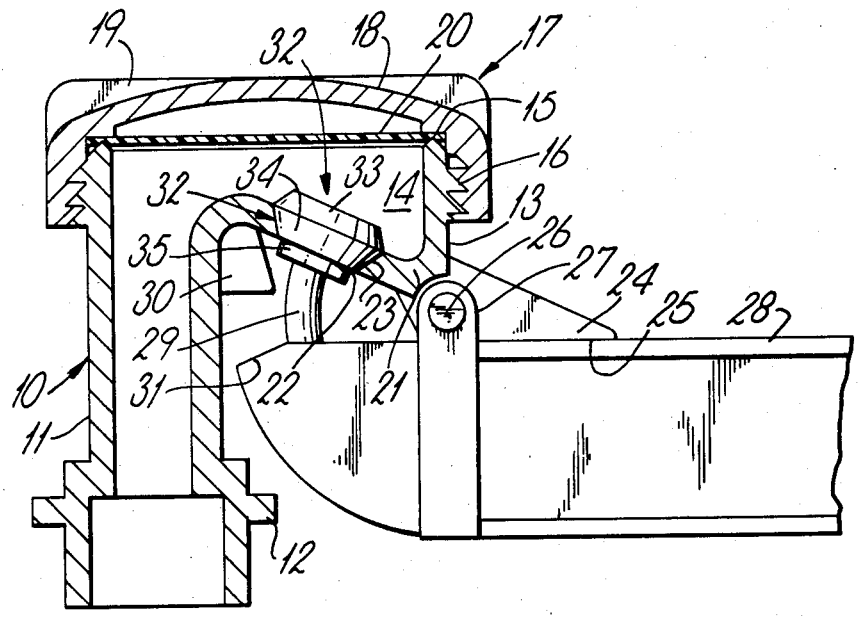
FIG. 1 is a cross-section through the chamber of one embodiment of valve mechanism according to the invention.
Figure 2:
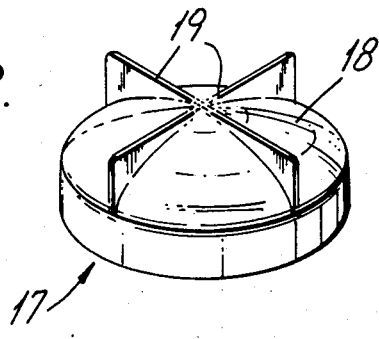
FIG. 2 is a schematic perspective view of the cap of the chamber.

Referring first to FIG. 1, there is illustrated therein a float valve mechanism including a body portion 10 having an inlet pipe 11 which in turn has a flange 12 thereon enabling the pipe 11 to be connected to a water feed pipe (not shown). The upper part of the body 10 is opened out into a housing 13 which is offset to one side of the axis of the part 11 and defines an open topped chamber 14. The upper edge of the chamber, which is annular, is formed with a sharpened ridge 15 below which there is a male screw thread 16 having a fairly coarse pitch. Screwable onto the thread 16 is a cap 17 which has a domed surface 18 and four equi-angularly disposed radial ridges 19 can be seen more clearly in FIG. 2. The inside of the cap is provided with a seal ring 20 which the ridge 15 bites into when the cap is screwed firmly down on to the housing 13, thereby to form a closed chamber.

The lower wall 21 of the housing 14 is angled downwardly to the right and is formed with an outlet aperture 22 which is the lower part of a conical valve seat 23. Two spaced apart flanges 24, only one of which can be seen in FIG. 1, are each formed with a lower stop surface 25 and an aperture 26. Engaged in each aperture 26 are outwardly projecting pegs formed on wings 27 carried by an I-beam section lever 28. The pegs are spring-urged outwardly into these apertures 26 and form a pivot for the lever 28. Integrally formed on the lever 28 is a valve stem 29 having an enlarged tip (not shown). Formed on the housing 13 is an abutment 30 engageable by an end portion 31 of the lever.

On the end of the valve stem 29 is mounted a valve head 32 which includes an upper frusto-conical portion 33 and a lower frusto-conical portion 34 which is shaped to conform to the cone of the valve seat 23. The valve head 32 also includes a skirt portion 35, which in this instance is indicated as frusto-conical, having a conicity of a smaller cone angle than that of the portion 34. Alternatively, the skirt portion could be cylindrical. In either event, the diameter of the skirt portion 35 is slightly less than the diameter of the outlet port 22. The valve head may be formed integrally with the valve stem 29, but is preferably formed separately from it and is formed of a relatively soft resilient material such as rubber or plastics. In order to engage the tip on the valve stem 29 the valve head has a correspondingly shaped cavity, so that the valve head can be engaged on the valve stem as a snap fit.

In order to assemble the so far described parts, the cap 17 is removed, the lever is forced between the flanges 24 which can spring out slightly and/or the wings 27 can spring in slightly, until the pegs engage in the apertures 26 to form a pivot. The lever 28 is then pivoted downwardly in a clockwise direction, somewhat, and the valve head 32 is forced downwardly on the valve stem until the snap fit is completed. The cap 17 can then be screwed on and tightened up with assistance from the ridges 19.

At the far end, the lever is provided with a float (FIG. 3) including a closed container which has, adjacent to its bottom, a series of apertures 41. The container also includes an upwardly extending neck portion 42 which is closed at its top 43 and is provided, significantly below this top 43, with a second set of apertures 44. Extending upwardly from the end 43 is a screw threaded stud 45 which can be passed through openings 46 in the lever 28. The vertical position of the float with respect to the lever can be controlled by an adjstment screw 47 which cooperates with the stud 45.

With the valve arrangement described mounted in a tank or cistern, if the tank is originally empty the lever 28 will be pivoted downwardly until the abutment 30 is engaged by the surface 31 on the lever. At this position the valve head 32 will still be spaced from the right wall of the chamber 14. As the water level rises, the float will generally rise and as it does, there will be some inward leakage of water through the aperture 41 into the float 40. The lever will continue to pivot until the valve nearly arrives at its point of closure. Water pressure within the chamber 14, which is a fully closed chamber, will then force the conical surface 34 towards the valve seat 23. However, the actual closure will be slowed down by the skirt portion 35 having a throttling effect on the water as it passes through the outlet. This will ensure that the valve head will not shut too suddenly. Because the material of the valve head is a relatively soft material, there will also be a slight cushioning effect as the conical surface 34 engages the conical valve seat 23 and both of these measures will have the effect of reducing any tendency for water hammer.

Immediately after the valve head surface 34 has engaged the valve seat 23, the lever 28 will abut the stop 25 thereby preventing any further pivoting motion, so that there will be no tendency for the valve head to be pulled off the valve stem 29. The water in the tank or cistern will continue to flow into the opening 41 in the float 40 until the water level reaches the higher openings 44. There will still be a significant amount of air above the openings 44 to give some measure of buoyancy. However the valve will be maintained not so much by the upthrust of the float, but rather by the water pressure within the closed chamber 14.

When the water level again drops, the float will be relatively heavy and when the water level gets down sufficiently low for the effective weight of the float to be sufficiently high to overcome the water pressure in the chamber 14 acting on the valve head 32, the lever will pivot clockwise until the surface 31 engages the abutment 30. Water will then again flow into the tank or cistern which will fill up as described previously.

We claim:

1. A float valve mechanism for a cistern or tank, said mechanism comprising a valve housing defining a closed chamber having an inlet port adapted to be connected to an inlet pipe to the cistern or tank, an outlet port from the chamber having a conical valve seat surrounding the port, a valve member passing through the outlet port and having a valve head located within the chamber, a pivotally mounted lever, a float at one end of the lever remote from the chamber, means connecting the lever to the valve member to raise the head from the seat, when water or other liquid in the cistern or tank falls below a certain level, effective to allow liquid to flow from the chamber via the outlet port, the valve member being connected directly to the lever, whereby it may pivot integrally therewith along a path passing through said outlet port, a conical surface on said valve head adapted to engage the conical valve seat in a liquid tight manner, and a skirt portion integrally formed on said valve head and extending downwardly beyond the narrower end of the conical surface of said valve head, and having a diameter slightly less than the smallest diameter of said conical valve seat, whereby, as the valve moves toward its closed position, and as said skirt portion passes through the outlet port, it is effective to slow the flow of water or other liquid through said outlet port immediate prior to closing and thereby prevents water or other liquid hammering from occurring.

2. A float valve as claimed in claim 1, wherein the skirt portion is conically tapered having a taper angle of less than that of the conical surface of the valve head.

3. A float valve as claimed in claim 1, wherein the skirt portion is substantially cylindrical.

4. A float valve according to claim 1, wherein the valve head is formed of a resilient material.

5. A float valve as claimed in claim 1, wherein the valve head is connected to the lever by a valve stem, and wherein the valve head is formed separately from the valve stem, the valve head being fastened to the valve stem subsequent to the valve stem being mounted in said chamber.

6. A float valve as claimed in claim 5, wherein said closed chamber comprises a main body portion including said inlet and outlet ports, a threaded opening on the other side of the chamber spaced from the inlet and outlet ports, effective to enable the head to be fitted on the valve stem by passing the head through the opening and engaging it on the valve stem after the valve stem has been passed through the outlet port, and a threaded cap threadably securable on said threaded opening effective to close said chamber.

7. A float valve as claimed in claim 6, wherein said cap is domed, so as to be outwardly convex and further comprising a plurality of external, angularly spaced, radial ribs, effective to strengthen the cap and facilitate screwing of the cap onto and off the main body portion.

8. A float valve as claimed in claim 1, further comprising a stop on the housing, effective to be engaged by the lever as it pivots towards the closed position of the valve, shortly after the valve head engages the valve seat.

9. A float valve as claimed in claim 1, the housing further comprising an abutment engageable by the lever, as the lever moves to the open position of the valve, the lever engaging the abutment after the valve is fully open.

10. A float valve as claimed in claim 1, wherein said float comprises a closed chamber having at least one first aperture adjacent to the bottom of the container and at least one second aperture spaced from the top of the container, whereby, as the water level in the tank or cistern rises, water will flow in through said at least one first aperture, until the water level reaches that of said at least one second aperture, whereupon no further water can be introduced thereby to provide a weighted float.

* * * * *